United States Patent [19]

Yoshikawa et al.

[11] Patent Number: 4,651,314
[45] Date of Patent: Mar. 17, 1987

[54] OPTICAL RECORDING AND REPRODUCING EQUIPMENT

[75] Inventors: Shoji Yoshikawa, Hachioji; Saburo Funada, Hamura, both of Japan

[73] Assignee: Olympus Optical Co., Ltd., Tokyo, Japan

[21] Appl. No.: 775,962

[22] Filed: Sep. 13, 1985

[30] Foreign Application Priority Data

Sep. 14, 1984 [JP] Japan ................. 59-194242

[51] Int. Cl.⁴ ............................. G11B 7/00
[52] U.S. Cl. ...................... 369/45; 250/201
[58] Field of Search .................. 369/44–46; 250/201 DF; 350/255

[56] References Cited

FOREIGN PATENT DOCUMENTS

| | | | |
|---|---|---|---|
| 56-148745 | 11/1981 | Japan . | |
| 57-113428 | 7/1982 | Japan | 369/45 |
| 59-146450 | 8/1984 | Japan | 369/45 |
| 59-185038 | 10/1984 | Japan | 369/45 |
| 2110433 | 6/1983 | United Kingdom | 369/45 |
| 2110434 | 6/1983 | United Kingdom | 369/45 |

Primary Examiner—Aristotelis M. Psitos
Attorney, Agent, or Firm—Armstrong, Nikaido, Marmelstein & Kubovcik

[57] ABSTRACT

The light beam from a semiconductor laser that generates laser light for recording or reproducing is irradiated onto a disk through an objective lens and the light reflected from the disk is received by a four quadrant light detector with four light receiving areas. Based on the light received by the light receiving areas, first and second feedback signals are generated and fed to servo actuators to control the objective lens in tracking and focusing. These signals are supplied to the actuators for tracking and focusing through switches to apply the tracking servo and focusing servo functions. When there is any change in the total quantity of light received by the light detector, the loop gain of the servo system is kept constant by controlling the duty ratio of opening and closing of the switches by means of control signals which have a frequency sufficiently higher than the response frequency of the feed back signals, thereby intermittently turning on and off the servos in a variable duty cycle that compensates for the change in light quantity.

8 Claims, 16 Drawing Figures

OPTICAL RECORDING AND REPRODUCING EQUIPMENT

FIELD OF THE INVENTION

This invention relates to an optical recording and reproducing equipment which records and reproduces optically the information on a recording medium and prevents the operation of the focusing and tracking control systems in, for example, an optical disk device and optical magnetic disk device, from becoming unstable due to a change in the optical conditions.

Optical recording and reproducing equipment using laser light records and reproduces the information by condensing the laser light at a small spot on the disk by means of a diaphragm lens (objective). But when the disk is rotated a so-called surface deflection occurs and, therefore, it is necessary to control the focusing by moving the diaphragm lens to follow the surface deflection so that the small spot of light is always focused on the disk, and it is also necessary to control the tracking so that the spot accurately follows the information track.

BACKGROUND OF THE INVENTION

A conventional method of focusing control obtains a focusing error signal by introducing astigmatism into the light reflected from the disk by using a cylindrical lens, and utilizing the fact that the shape of the reflected light beam on a four-quadrant light detector changes due to the surface deflection of the disk. The following will explain the conventional art by referring to FIGS. 9 to 11. In the following explanation the same elements are shown by the same symbols.

Figure 9:
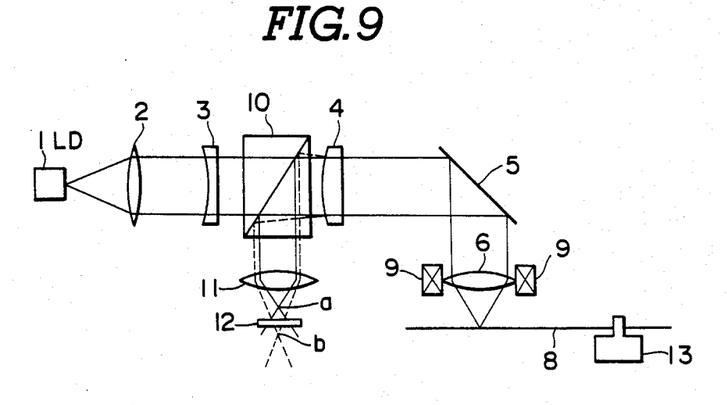
FIG. 9 is a block diagram to show the configuration of the optical head in optical recording and reproducing equipment to which this invention may be applied.

FIG. 9 is a block diagram illustrating schematically one example of a conventional optical recording and reproducing equipment which incorporates a focusing control device. The optical system consists of a light source 1 of a semi-conductor laser, condenser lens 2 to condense the light beam from the light source 1, cylindrical lenses 3 and 4 which have a lens effect only in one plane to compensate for the light beam from the light source 1 having different spreading angles in the vertical and horizontal directions, polarizing beam splitter 10 arranged between the lenses 3 and 4, reflecting mirror 5 to reflect the light from the light source 1 and disk 8, and a magnetic diaphragm lens driving device 9 which is similar to the voice coil of a speaker and moves the diaphragm lens 6 by means of a servo control system to follow the surface deflection of disk 8 so that the focus of the small spot of light is always on the disk 8.

The disk 8 is rotated by the disk motor 13. The beam splitter 10 refracts the light reflected from the disk 8 as illustrated, and the convex lens 11, in cooperation with the convex cylindrical lens 4, irradiates the reflected light on the light detector 12 so as to introduce astigmatism into the reflected light. That is, the focal point of the light reflected from the disk 8 in the plane of light where the convex cylindrical lens 4 is effective is at position a indicated in solid lines and the focal point of the light reflected from the disk 8 in the plane of light where the convex cylindrical lens 4 is not effective is at position b indicated in broken lines. Since the reflected light is condensed at different points as aforementioned, the light detector consisting of four quadrants detects the change in the shape in accordance with the surface deflection of the disk 8.

Figure 10:
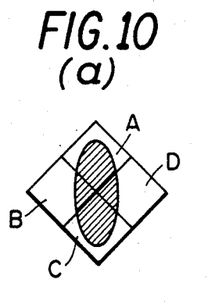
FIG. 10, consisting of (a)–(c), is an explanatory diagram to show the shapes of the light pattern received by a light detector used in this invention.

FIG. 10 is an explanatory figure to show the shapes of the reflected light pattern received by the four light receiving areas of the light detector shown in FIG. 9 and the change in shape of the reflected light pattern on the light detector 12 in accordance with the surface deflection. FIG. 10(b) shows the reflected light pattern when the distance between the diaphragm lens 6 and disk 8 is a desired length and the small spot is formed on the disk 8 and the reflected light is almost circular on the light detector 12. FIG. 10(a) and (c) show the reflected light patterns on the light detector 12 when the distance between the diaphragm lens 6 and disk 8 is shorter or longer than the desired length.

If the quantities of light received by quadrants A, B, C and D are $P_A$, $P_B$, $P_C$ and $P_D$, respectively, the focusing error signal Ue will be:

$$Ue = (P_A + P_C) - (P_B + P_D) \qquad (1)$$

and when Ue=0 the small spot is formed on the disk.

Figure 11:
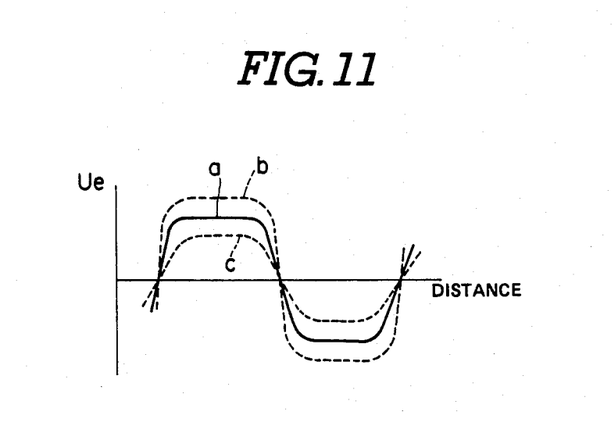
FIG. 11 is a figure to show the characteristic change of the focus error signal due to surface deflection of the disk.

FIG. 11 is an explanatory figure to show the change in characteristics of the focusing error signal Ue in accordance with surface deflections of the disk 8, and the relative distance between the condenser lens 6 and disk 8 is shown on the axis of the abscissa and focusing error signal Ue on the axis of the ordinate. The axis of the signal Ue can be considered to be the surface of the disk. The focusing error signal Ue is given by the above formula (1) and is proportional to the quantities of light $P_A$ through $P_D$ received on the four light receiving quadrants A through D of the light detector. Therefore, in comparison with the focusing error signal as shown by the symbol a (the characteristic when there is no surface deflection) in FIG. 11, the focusing error signal when the disk 8 approaches the objective 6 due to surface deflection increases as shown by the symbol b because the reflection to the objective 6 increases. If the quantities of received light $P_A$-$P_D$ relatively decrease because the amount of reflection to the objective 6 decreases or the lens is contaminated, the focusing error signal Ue decreases as shown by the symbol c in the figure.

Therefore, in such a focusing control as aforementioned, the focusing error signal is changed when the reflectance of the disk changes, when there is a considerable change in the quantity of reflected light due to the continuous emission of the laser light during reproduction, recording or erasing of the optical magnetic disk, when there is a change in the quantity of light due to the power correction in the radial direction of the disk, or when the quantity of light incident upon the light detector is changed due to contamination or deterioration of the optical parts. For this reason, it has the disadvantage that the total gain within the focusing control loop is changed. If the quantity of reflected light decreases, the gain decreases and the accuracy with which it follows the surface deflection is deteriorated, and if the quantity of reflected light increases, the gain increases and the system becomes unstable and oscillation tends to occur.

As to the tracking system, the tracking error signal Ute is:

$$Ute = P_B - P_D \qquad (2)$$

and therefore, the system becomes unstable because the loop gain of the servo system is increased or decreased due to the change in the quantity of light.

In order to eliminate the aforementioned disadvantages, such device as shown in Japanese Patent Journal No. 56-148745 has been proposed. But that device uses a FET as a variable resistance and the FET characteristics have a high dispersion, and even if the devices are formed under the same constant conditions, adjustment is required. Also, even if a constant voltage is applied between the gate and source, the transfer function of the circuit system is changed due to the change in ambient temperature, etc., and the DC drift of the output taken out of the drain side is large and therefore it is difficult to put it to practical use.

OBJECT OF THE INVENTION

This invention was made to eliminate the aforementioned disadvantages of the conventional devices and has the objective to obtain an optical recording and reproducing equipment which includes an easy to manufacture and easy to adjust focusing and tracking control device where the gain of the control loop can be kept constant even if there is a change in the quantity of light from the light source and reflected light.

SUMMARY OF THE INVENTION

In order to achieve the above objective, this invention controls the continuity period of a switching means provided in the servo loops of the focusing and tracking means to alternately open and close the servo loops, in accordance with control signals, at a sufficiently higher frequency than that of the feedback signal running through the servo system.

DETAILED DESCRIPTION OF PREFERRED EMBODIMENTS

First of all, the configuration of this invention will be explained by dividing it into the tracking control system and focus control system.

Tracking Closed-Loop Control System

Figure 1:
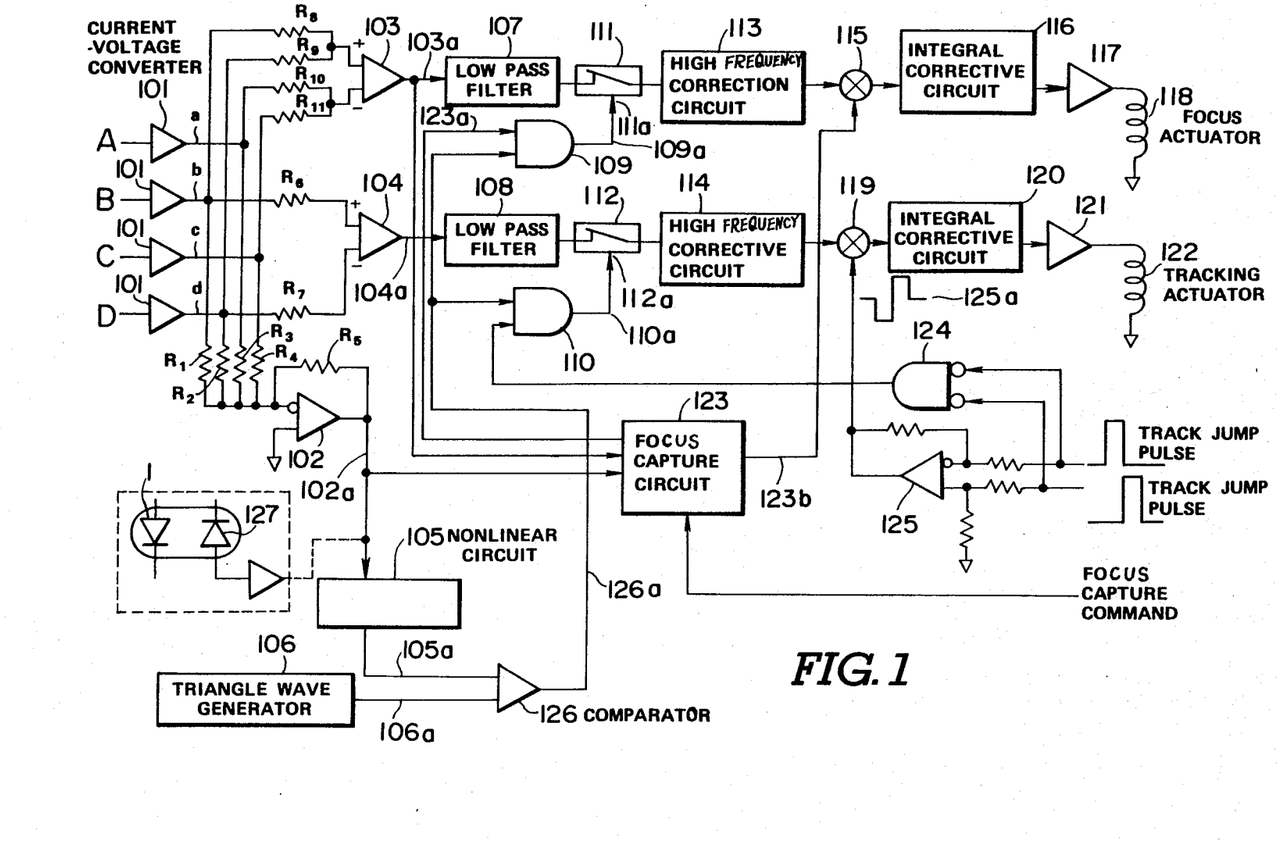
FIG. 1 is a circuit diagram showing one embodiment of the optical recording and reproducing equipment of this invention.

In FIG. 1, A, B, C and D indicate the light input value information from the light receiving quadrant areas explained in FIG. 10. These are input as current signals to the current-voltage converters 101 and converted into voltage signals, a, b, c and d. These voltage signals a, b, c and d are summed by the summing resistance R1, R2, R3 and R4 to represent the total amount of light and input to the amplifier 102. It goes without saying that the output 102a of the amplifier 102 is the sum of the reflected light from all four quadrants of the disk 8. The resistance R5 is connected between the output and input of amplifier 102, and the signal 102a from the output is input to the non-linear circuit 105. The non-linear circuit 105 supplies the output 105a to the first input of the analog comparator 126. To the second input of the comparator 126 the signal 106a from the triangle wave generator 106 is input. The output 126a of the above comparator 126 is supplied to the 2-input type first AND circuit 110.

On the other hand, the signals b and d are input to the differential amplifier 104 via the resistances R6 and R7 and the output 104a of the amplifier 104 represents the difference of these two signals and is introduced into one input of the summing amplifier 119 via the low-pass filter 108, switch 112 for tracking control and high frequency corrective circuit 114 consisting of a differentiation circuit. The switch 112 has a control input 102a to which the first control signal 110a from the first AND circuit 110 is supplied to operate the switch. To the other input of the first AND circuit 110 is connected the output of the NOR gate 124. Connected to the two inputs of the NOR gate are two track jump pulses which are different in timing, causing the switch 112 to be opened at the time of track jump except the period of control by this invention.

The aforementioned summing amplifier 119 is equivalent to the so-called summing point of the tracking closed-loop control system. The bipolar pulse as shown by the symbol 125a is input to the other input of the summing amplifier 119; the pulse 125a is obtained by passing the aforementioned two track jump pulses through a circuit including as the active element inverter 125. The output of the summing amplifier 119 is supplied to the tracking actuator coil 122 to be controlled thereby, via the integral control element corrective circuit 120 and amplifier 121.

Focus Closed-Loop Control System

The focus closed-loop control system has a configuration to separately sum the signal b and d and a and c by means of the resistance R8 and R9 and R10 and R11, respectively, and the signals from the resistance summing sections are input to the differential amplifier 103. The output 103a of the differential amplifier 103 is the difference between the two sums and is supplied to one input of the summing amplifier 115 via the low pass filter 107, switch 111 for focus control and high frequency correction circuit 113 consisting of a differentiation circuit. The switch 111 has the control input 111a to which the signal 109a from the second AND circuit 109 is impressed to operate the switch as in the case of the tracking control system. That is, to one input of the second AND circuit 109 the output 126a from the aforementioned comparator 126 is input, and to the other input the signal 123a from the focusing capture circuit is input. The signal 109a is applied to open the aforementioned switch 111 via the second AND circuit 109 if there is a focus capture command signal in the focus capture circuit 123. The focused capture circuit 123 receives signal 102a and signal 103a and supplied the signal 123b based on the signals 102a and 103a to the other input of the summing amplifier 115. This signal 123b is input when the switch 111 is opened and the output of the summing amplifier 115 is supplied to the focus actuator 118 via the integral control element corrective circuit 116 and amplifier 117.

Figure 2:
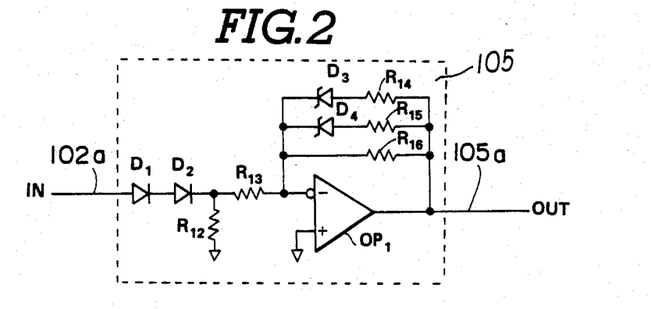
FIG. 2 is a circuit diagram to show one example of a non-linear circuit used to control the characteristics of the information signal to an output level suitable for the control by this invention.
Figure 4:
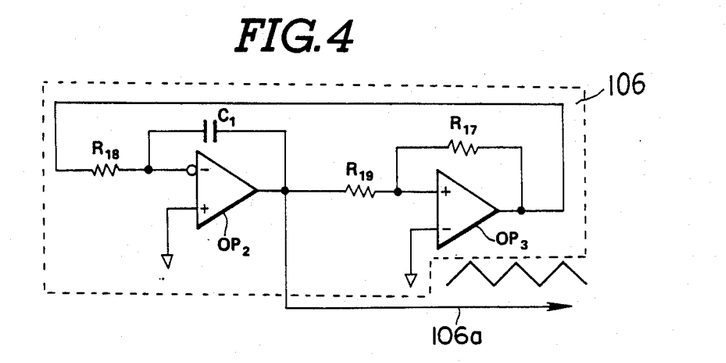
FIG. 4 is a figure to show one example of a circuit to produce a waveform necessary for the control by this invention.

The following will explain one example of the non-linear circuit 105 and triangle wave generator 106 used in the embodiment referring to FIGS. 2 and 4.

Figure 3:
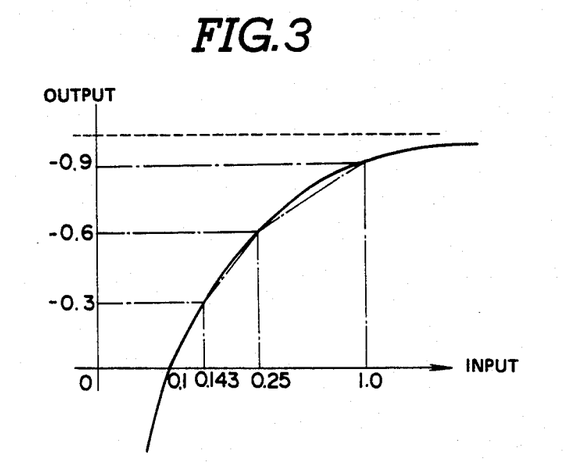
FIG. 3 is a figure to show the input/output characteristics of the above circuit.

In FIG. 2, the input signal 102a is introduced via the diodes $D_1$ and $D_2$ connected in series to one end of the resistor 12 whose another end is connected to a reference point of potential and the signal from the end of the resistor 12 is supplied to the inverted input of the operational amplifier $OP_1$ via the resistance $R_{13}$. The non-inverted input of the operational amplifier $OP_1$ is connected to the reference point of potential and the operational amplifier $OP_1$ outputs the signal 105a. The character of the input signal 102a is converted into that of the signal 105a as shown in FIG. 3 through 3 circuits, the series connection of diode $D_3$ and resistance $R_{14}$, the series connection of diode $D_4$ and resistance $R_{15}$, and resistance $R_{16}$, all connected in parallel between the output and inverted input of operational amplifier $OP_1$. That is, the circuit shown in FIG. 2 is a kind of amplitude compression circuit and it can convert the normalized input signal level shown on the axis of the abscissa into an output level which changes approximately linearly as described below. The reason why the non-linear circuit 105 is provided is that it is necessary to make the gain of the servo system inversely proportion to the quantity of light received by the light detector 12.

The triangle wave generator in FIG. 4 mainly consists of 2 operational amplifiers $OP_2$ and $OP_3$. Capacitor $C_1$ is connected between the inverted input of the operational amplifier $OP_2$ and the output to determine the cycle of the triangle wave produced. Resistor $R_{17}$ is connected and between the non-inverted input of the operational amplifier $OP_3$ and the output to determine the amplitude of the triangle wave. The charging and discharging of the capacitor $C_1$ is maintained by connecting the output of the operational amplifier $OP_3$ to the inverted input end of the operational amplifier $OP_2$ via the resistor $R_{18}$ and the output of the operational amplifier $OP_2$ to the non-inverted input of the operational amplifier $OP_3$ via the resistor $R_{19}$.

Operation of Tracking Control System

The current signals detected from the A, B, C, and D of the light detector are each converted into voltage signals by one of the current/voltage converters 101, and the track error signal is generated by the resistors R5 and R7 and differential amplifier 104. The high frequency component is eliminated from the tracking error signal by the low-pass filter 108, and thereby the "aliasing phenomenon" of the noise produced when the analog switch 112 is opened or closed is eliminated. The "foldover phenomenon" of the noise is an occurrence of the noise component that is symmetrical to the sampling frequency which is caused in the sampling output signal when the input signal is sampled through the analog switch. The high frequency corrective circuit 114 is a differentiating circuit to correct the high frequency characteristic of the tracking actuator 122 and the summing amplifier 119 is to sum the tracking error signal given through the high frequency corrective circuit 114 and the jump pulse signal 125a. The integral control element corrective circuit 120 increases the low band gain of the servo loop in the output of the summing amplifier 119 and supplies it to the tracking actuator 122 via the amplifier 121 which amplifies the signal to a power sufficient to drive the tracking actuator 122.

The following will explain the method to optimize the loop gain by using the analog switch 112. The outputs a, b, c and d of the current/voltage converter 101 are summed by the resistance $R_1$–$R_4$ before the amplifier 102 and the quantity of light at the light detector 12 is detected and it is provided to the input of non-linear circuit 105. Since the input/output characteristics of the non-linear circuit 105 are as shown in FIG. 3, despite the logarithmic characteristic of the change of light quantity at the light detector 12, the output 105a of the non-linear circuit 105 is converted into a signal which changes linearly and is connected to one input of the comparator 126. The output signal of the triangle wave generator 106 is connected to the other input of the comparator 126. By setting the generated frequency of the triangle wave higher by a specified amount than the frequency of the signal running through the loop when the system is closed, and intermittently turning off the servo operation of the system not only when the track jump pulse occurs or when the focus capture operation command is released but also at all other times, the present invention can make the loop gain constant despite the change in the quantity of detected light due to surface deflection or other causes.

Figure 5:
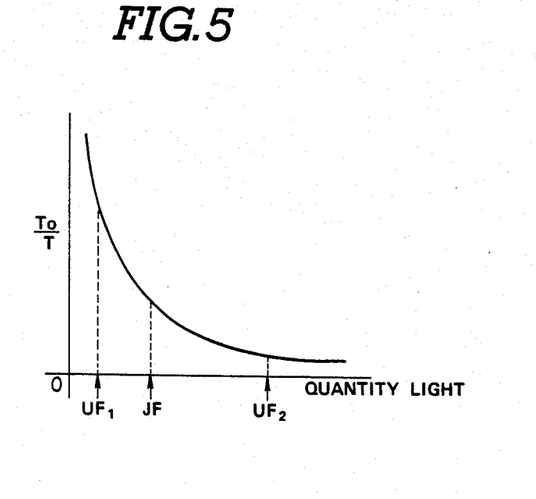
FIG. 5 is a characteristic diagram to show one example of the control characteristic by this invention.

In order to make the gain constant despite the change in the quantity of light after the gain of the system is initially set at an optimum value, the relationship of the continuity time ($T_0/T$), or duty ratio of the analog switch 112, to the quantity of light of the light detector should be as shown in FIG. 5. That is, the time ratio $T_0/T$ should be in inverse proportion to the quantity of light of the light detector.

Figure 6:
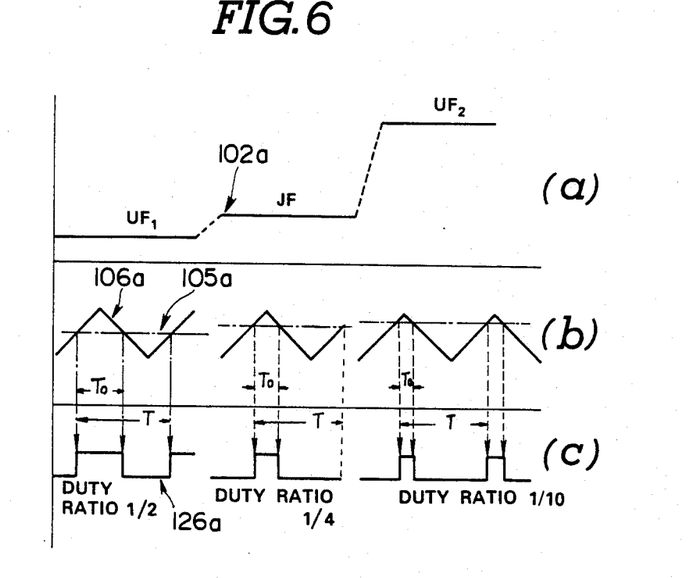
FIG. 6, consisting of (a)–(c), is an explanatory diagram to show the timing of the control operation of this invention.

The time chart of FIG. 6 shows the timing at which the switch (112 or 111) is controlled as aforementioned. (a) indicates the output 102a of the amplifier 102, and JF indicates the output level when the light is just focused, i.e. operation is begun; $UF_1$ represents the output level when the light level from the disk 8 decreases from the initial value, and $UF_2$ the output level when the light level from the disk 8 increases. (b) compares and indicates the triangle wave output 106a and the output 105a after the output level 102a of (a) above is corrected by the non-linear circuit 105. (c) indicate the changes in the duty ratio of the output 126a of the comparator 126 under the above conditions.

The output frequency of the triangle wave generator 106 is set at a sufficiently high frequency, between 10 kHz and several hundred kHz higher than the highest servo response frequency.

If the output of the non-linear circuit 105 and that of the triangle wave generator 106 are compared by the comparator 126, the output level of the comparator 126 changes when the triangle wave 106a passes the level of the output 105a from the non-linear circuit 105. That is, if the threshold level of the comparator 126 is set by the different input levels $UF_1$, JF or $UF_2$ under each condition, the time period during which the triangle wave 106a exceeds the threshold level changes for each threshold level. Thus, the output consists of pulses of a duty ratio as shown in FIG. 6(c). Since the analog switch 112 is controlled ON or OFF by these pulses, the tracking error signals are chopped and the chopped voltage is averaged. This makes it possible to keep the loop gain of the system at an optimum value despite any change in the total quantity of light.

Although not specially required for the above averaging means because the frequency characteristics of the entire system are sufficiently lower than the chopping frequency, such a low-pass filter as not to adversely affect the frequency characteristics of the servo system may be used.

The tracking system is usually provided with a jumping means to move the beam to the next track. In the embodiment shown in FIG. 1, the jump is made by shutting off the servo loop due to the tracking error via the NOR circuit 124 and first AND circuit 110, generating a bipolar pulse via the wave combining circuit including the inverter 125 and adding it to the summing amplifier 119 and adding the output of the summing amplifier 119 to the tracking actuator 122 via the integral control element corrective circuit 120 and amplifier 121, and the track movement is completed by closing the loop by means of the analog switch 112. In this embodiment the analog switch 112 can be commonly used for the gain adjustment and for the loop shut-off at the time of the above jump, thus making the configuration simple and the cost low.

Although in this embodiment the gain adjustment is made by means of the total quantity of light on the light detector, the gain can be adjusted by means of the output from a monitor 127 for automatic laser output adjustment when the change in the quantity of laser light during the recording and reproduction is the main cause of the change in loop gain.

The configuration of the focusing system is almost the same as that of the above tracking system. In order to induce the focus actuator 118 to the focus point by means of the focus capture circuit 123, it is necessary to shut off the focusing servo loop by means of the analog switch 111, but in such a case, too, as explained in the tracking system, the configuration can be made simple because the analog switch 111 can also be used for the gain adjustment.

Figure 7:
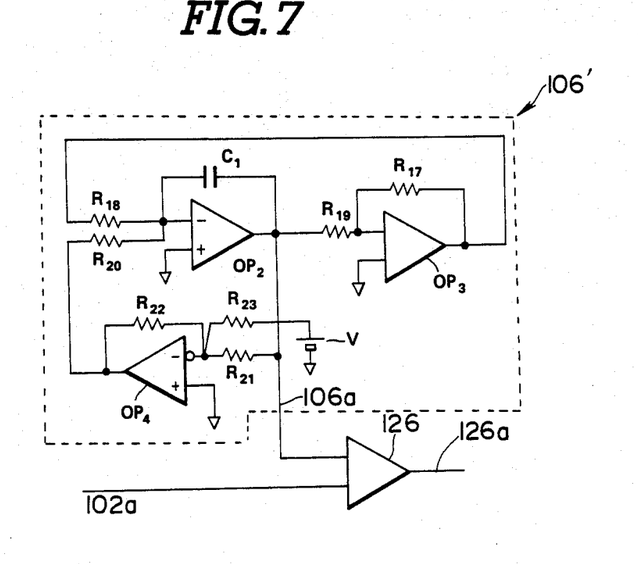
FIG. 7 is a circuit diagram to show another embodiment of this invention.
Figure 8:
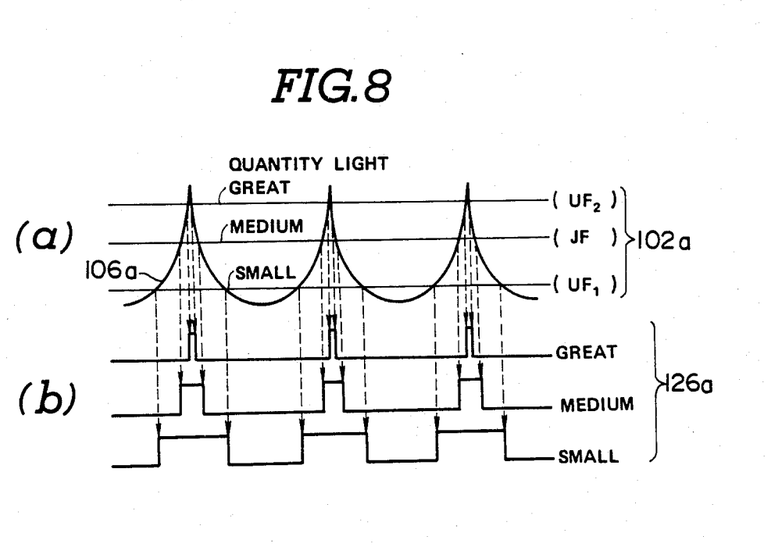
FIGS. 8(a) and 8(b) explain the operation of this invention by means of the embodiment in FIG. 7.

FIG. 7 is a circuit diagram to explain another embodiment of this invention and FIG. 8 is a waveform diagram to explain its operation. That is, in the embodiment shown in FIG. 1 the output of the summing amplifier 102 is compressed via the non-linear circuit 105 and its output is input together with the output waveform of the triangle wave generator 106 to the comparator 126, but by replacing the triangle wave generator 106 of FIG. 4 with the non-linear repetitive wave generator 106' in FIG. 7 and inputting its output waveform 106'a together with the output 102a of the summing amplifier 102 to the comparator 126, it is possible to generate the pulses with different duty ratios as shown in FIG. 8 and to obtain the same effect as that of the embodiment shown in FIG. 1 without compressing the output of the summing amplifier 102.

FIG. 8(a) indicates the levels of the amplifier output 102a when the quantity of light is great, medium and small (for example, $UF_2$, JR and $UF_1$ in the previous embodiment) and the output 106'a of the non-linear repetitive wave generator 106' in comparison with the levels. FIG. 8(b) indicates the levels of the output 126a of the comparator 126 when the quantity of light is great, medium and small.

In FIG. 7 the circuit including the operational amplifier $OP_2$ and $OP_3$ is same as that in FIG. 4, and the circuit including the operational amplifier $OP_4$ is used to attenuate both slope levels of the triangle wave from the circuit of $OP_2$ and $OP_3$ at a fixed rate. For this reason, the output 106'a become parabolic. This attenuation factor depends on the voltage V and resistances R20, R21 and R22 values.

As aforementioned, in this invention, switching means are provided in the servo loops of the focusing means and tracking means and are controlled by means of specified signals and, therefore, it is possible to obtain a stable optical recording and reproducing equipment which can keep the loop gain constant even if there is a change in the quantity of light from the light source during recording, reproducing and erasing of data, a change in reflectance of the disk or a change in optical characteristics due to specular change of the optical system. Also, since it adopts the time division control, the effect of dispersion in characteristics of the elements used in very small and the adjustment is easy. For this reason it is suitable for mass production and the cost can be reduced. The circuit configuration is simple and economical, and in addition, since the conventionally used analog switch for loop shut-off can be used in common, simplicity and reliability can be promoted. Furthermore, since, the gain is optimized through control of the duty ratio of pulses, systematization is easy and development and extension are easy in the utilization of a CPU, etc.

According to this invention, it is also possible to set the continuity time of the analog switch at a desired value by means of comparing and discriminating circuit, etc.

This invention is applicable to not only optical recording and reproducing equipment which has both recording and reproducing functions but also to equipment which has only a recording or a reproducing function.

The invention can use a two sector light detector instead of the four quadrant detector, and can also be applied to an optical recording and reproducing equipment which obtains the focus error signal and tracking error signal by utilizing the critical angle method instead of the astigmatism method.

We claim:

1. Apparatus for optically recording, reproducing and erasing information on a movable recording medium comprising:
   a light source for emitting light to perform said recording, reproducing and erasing operations;
   optical means for irradiating the light from said light source on said medium;
   first servo actuator means for adjusting the focus of said optical means to focus light on said medium;
   second servo actuator means for adjusting tracking of said optical means to follow an information track on said medium;
   first feedback signal generating means responsive to light reflected from said recording medium for generating a first error signal representative of a focusing error;

first switch means connecting said first error signal to said first servo actuator means;

second feedback signal generating means responsive to light reflected from said recording medium for generating a second error signal representative of tracking error;

second switch means connecting said second error signal to said second servo actuator means; and third signal generating means for generating a third signal which varies inversely with the intensity of light from said light source on said medium, and means for applying said third signal to both said first and second switch means to control the application of said first and second error signals thereto whereby the response of said servo actuator means to said error signals remains constant in spite of changes in intensity of said light.

2. Apparatus as recited in claim 1 wherein said third signal consists of a series of pulses at a set frequency, said pulses varying in length inversely with the intensity of light, whereby said switch means are caused to operate with a duty ratio inversely proportional to said light intensity.

3. Apparatus as recited in claim 2 wherein said duty ratio varies non-linearly with the intensity of said light.

4. Apparatus as recited in claim 1 wherein said first switch also serves as shut-off means at times of focus servo capture.

5. Apparatus as recited in claim 1 wherein said second switch also performs as tracking servo shut-off means at times of track jump.

6. Apparatus as recited in claim 1 wherein said third signal generating means is responsive to light intensity reflected from said recording medium.

7. Apparatus as recited in claim 1 wherein said third signal generating means is responsive to the light intensity of said light source.

8. Apparatus as recited in claim 1 wherein said third signal generating means comprises means for generating a first voltage of an amplitude that varies directly with the intensity of light, means for producing a second voltage which has a waveform that changes repetitively at a set frequency, and comparator means for combining said first and second voltages to generate said third signal as a series of pulses of said set frequency having a duty ratio that varies inversely with the amplitude of said first voltage.

* * * * *